United States Patent [19]
Jennings et al.

[11] Patent Number: 6,119,238
[45] Date of Patent: Sep. 12, 2000

[54] APPARATUS FOR GENERATING A POWER OFF/ON SIGNAL

[75] Inventors: James R. Jennings, Knoxville; Earl J. Erickson, Jefferson City, both of Tenn.

[73] Assignee: Philips Electronics North America Corporation, New York, N.Y.

[21] Appl. No.: 09/201,047

[22] Filed: Nov. 30, 1998

[51] Int. Cl.[7] .................. G06F 1/30; H02M 7/00; H01F 19/00
[52] U.S. Cl. .......... 713/300; 713/340; 324/522; 327/143; 348/730
[58] Field of Search .................. 713/300, 310, 713/340; 714/14; 324/522, 648; 327/143; 348/730; 307/43; 323/355; 363/44

[56] References Cited

U.S. PATENT DOCUMENTS

| | | |
|---|---|---|
| 4,591,914 | 5/1986 | Hakamada et al. . |
| 5,446,404 | 8/1995 | Badyal et al. . |
| 5,682,748 | 11/1997 | DeVilbiss et al. . |
| 5,946,209 | 8/1999 | Eckel et al. . |

OTHER PUBLICATIONS

EPO Search Report, Mar. 2000.

*Primary Examiner*—Gopal C. Ray
*Attorney, Agent, or Firm*—Edward W. Goodman

[57] ABSTRACT

An apparatus, for generating a power OFF/ON signal for a microprocessor which receives operating power from a secondary winding of a transformer, includes a detector for detecting the input voltage of the transformer. When this input voltage drops below a given threshold level, a low voltage detection circuit provided by the apparatus generates the power OFF/ON signal for the microprocessor. By detecting the input voltage as opposed to the operating power of the microprocessor, the apparatus allows the microprocessor sufficient time to perform its shut-down functions before the operating power drops below a minimum level.

4 Claims, 2 Drawing Sheets

6,119,238

APPARATUS FOR GENERATING A POWER OFF/ON SIGNAL

BACKGROUND OF THE INVENTION

1. Field of the Invention

The subject invention relates to television receivers, and, more particularly, to the supply of operating power to a microprocessor controlling the functions in the television receiver.

2. Description of the Related Art

Most consumer electronic products, including television receivers, use a microprocessor to perform many of the needed functions of the product. This microprocessor needs to know when power is applied and also when power is removed in order to turn on and off in a safe and controlled manner. For example, if you turn off the television receiver when it was tuned to a specific channel and at specific settings of the volume, brightness, contrast, etc., when you turn the television receiver back on, it is desirable that the previous specific channel and settings are retained. This would be done by the microprocessor storing the various settings in memory. In order for the microprocessor to know that it needs to store these settings, it must receive a power OFF signal. Similarly, in order for the microprocessor to know that these settings need to be restored, it needs a power ON signal. The power ON signal informs the microprocessor that its operating power has been applied and is at the correct level for proper operation. The power OFF signal informs the microprocessor that its operating power will soon drop below its correct level for proper operation.

The power OFF signal must inform the microprocessor sufficiently early so that the microprocessor has sufficient time to perform all of its needed functions before the operating power drops from 5 VDC to 4.5 VDC. This small voltage difference along with the amount of time needed to perform the shutdown functions makes it difficult and impractical to use the $V_{CC}$ supply to sense the shutdown.

SUMMARY OF THE INVENTION

It is an object of the present invention to provide an apparatus for generating a power OFF/ON signal for a microprocessor which allows sufficient time for the microprocessor to perform the shutdown functions.

It is a further object of the present invention to provide apparatus for generating a power OFF/ON signal for a microprocessor which is isolated from the input circuitry of the controlled appliance.

The above objects are achieved in an apparatus for generating a power OFF/ON signal for a microprocessor, said microprocessor being supplied power from a flyback power supply including a rectifier bridge for rectifying an A.C. power source, a flyback transformer having a primary winding connected to the rectifier bridge, a switching device for connecting the primary winding to a reference voltage, a control circuit for controlling the switching of said switching device, and a secondary winding for supplying an operating voltage to the microprocessor, wherein said apparatus comprises means for detecting an input voltage of said flyback transformer, said means generating a control voltage proportionate to said input voltage; and means for sensing when said control voltage passes a threshold level, said sensing means generating a power OFF/ON signal for said microprocessor when said control voltage drops below said threshold level, and a power on signal for said microprocessor when said control voltage rises above said threshold level.

As described above, the apparatus of the subject invention senses the input voltage of the flyback transformer. This input voltage will start to decay immediately upon removal of power. However, due to the power supply's ability to work down to low input DC levels, the outputs will remain regulated for a given amount of time. The apparatus detecting this drop in the input voltage then signals the microprocessor that its supply voltage, generated by the flyback transformer, will drop imminently. This allows sufficient time for the microprocessor to complete its shutdown functions.

A particular embodiment of the apparatus of subject invention is characterized in that the detecting means comprises said flyback transformer being provided with a further secondary winding having a polarity opposite to that of said secondary winding, a voltage across said further secondary winding forming said control voltage.

Arranged as such, the apparatus is isolated from the input circuitry. This is an important safety issue. It is also cost effective in that ordinarily, circuitry required to get the power off/on signal across the isolation barrier can be relatively expensive. Moreover, by using a secondary winding of the flyback transformer, the winding voltage can be adjusted to minimize power dissipation. In particular, the input DC voltage may reach levels of 350 VDC. If one were to directly sense this input voltage, the circuit components would therefore need to dissipate this excessive power. By using the additional secondary winding, the sensing voltage may be dropped to, for example, 15 VDC.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
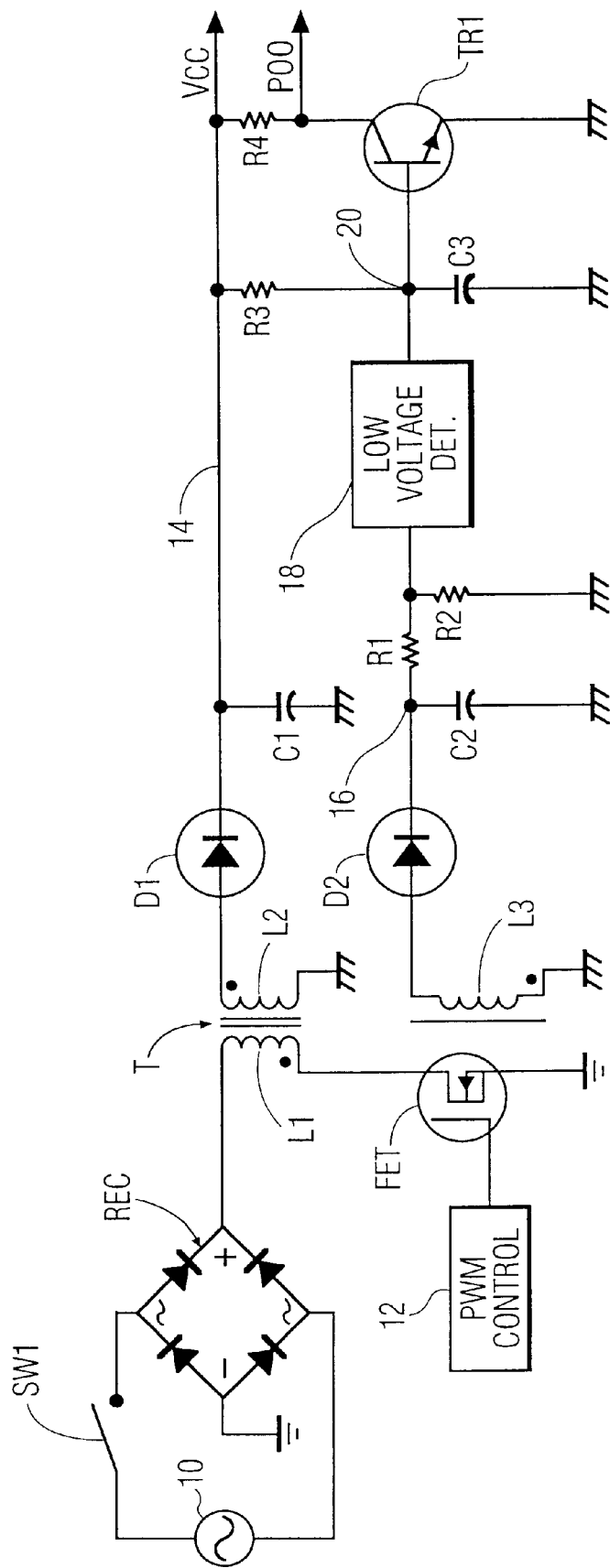
FIG. 1 shows a schematic diagram of the apparatus of the subject invention.

As shown in FIG. 1, power is supplied at line voltage 10 through a switch Sw1 to a diode rectifier bridge REC. An output from the diode rectifier bridge REC carrying the input voltage $V_{IN}$ is supplied to one terminal of a primary winding L1 of a flyback transformer T. The other terminal of the primary winding L1 is selectively connected to ground by a switching device FET controlled by a pulse-width modulation (PWM) controller 12.

The flyback transformer T has a first secondary winding L2 having one terminal connected directly to ground and the other terminal connected to ground via the series arrangement of a diode D1 and a capacitor C1. The junction between the diode D1 and the capacitor C1 is connected to a power supply line 14 carrying the supply power $V_{CC}$ for a microprocessor (not shown).

In order to detect the input voltage $V_{IN}$ on the primary winding L1, the flyback transformer T includes a second secondary winding L3 having one terminal connected directly to ground and the other terminal connected to ground via the series arrangement of a diode D2 and a capacitor C2. It should be noted that the second secondary winding L3 is polarized opposite to that of the first secondary winding L1. The junction 16 between the diode D2 and the capacitor C2 supplies the detection voltage $V_{DET}$. Depending on the input requirements of the low voltage detection circuit 18, a resistance voltage divider, including resistors R1 and R2, for dropping the detection voltage $V_{DET}$ to the proper level, connects the junction 16 to ground, and the junction between resistors R1 and R2 is connected to an input of the low voltage detection circuit 18.

The low voltage detection circuit 18 may be one of many well-known circuits, including The Undervoltage Sensing Circuit No. MC34064, made by Motorola. The output from the low voltage detection circuit 18 is connected to the junction 20 of a series arrangement of a resistor R3 and a capacitor C3 connecting the power supply line 14 to ground. The junction 20 is also applied to the base of an NPN transistor Tr1 having a emitter connected to ground and a collector connected to the power supply line 14 via a resistor R4. The collector of the NPN transistor Tr1 carries the power OFF/ON signal POO.

Figure 2:
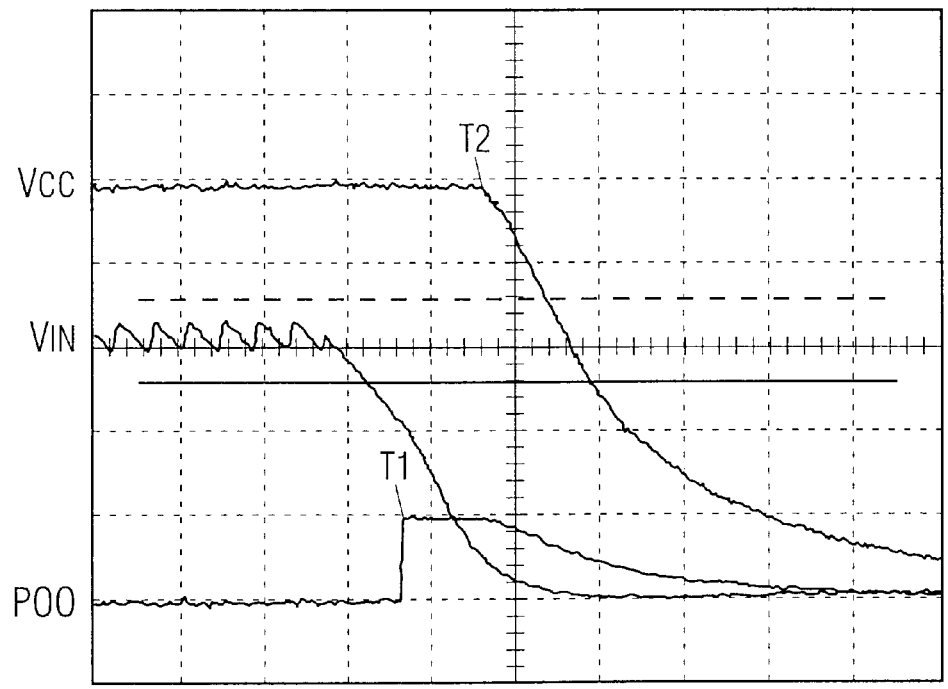
FIG. 2 shows a graph of the input voltage, the supply voltage, and the power OFF signal.

In operation, with the switch Sw1 closed, the line voltage is rectified in the diode bridge rectifier REC forming the input voltage, and the switching device FET is periodically switched by the PWM control 12 inducing a voltage on the first and second secondary windings L2 and L3. As shown in FIG. 2, as soon as the switch Sw1 is opened, the input voltage $V_{IN}$ begins to decay, causing the detection voltage $V_{DET}$ to decay at the same time. At the time T1, the detection voltage $V_{DET}$ has dropped to such a level that the low voltage detection circuit 18 removes a signal normally applied to the base of the transistor Tr1 causing the transistor Tr1 to open thereby generating the power OFF/ON signal POO at its collector. As shown in FIG. 2, it is not until time T2 that the supply power $V_{CC}$ begins to decay below the minimum operating power for the microprocessor. The difference between T1 and T2 is in the order of several milliseconds, sufficient for the microprocessor to perform its shut-down functions.

Figure 3:
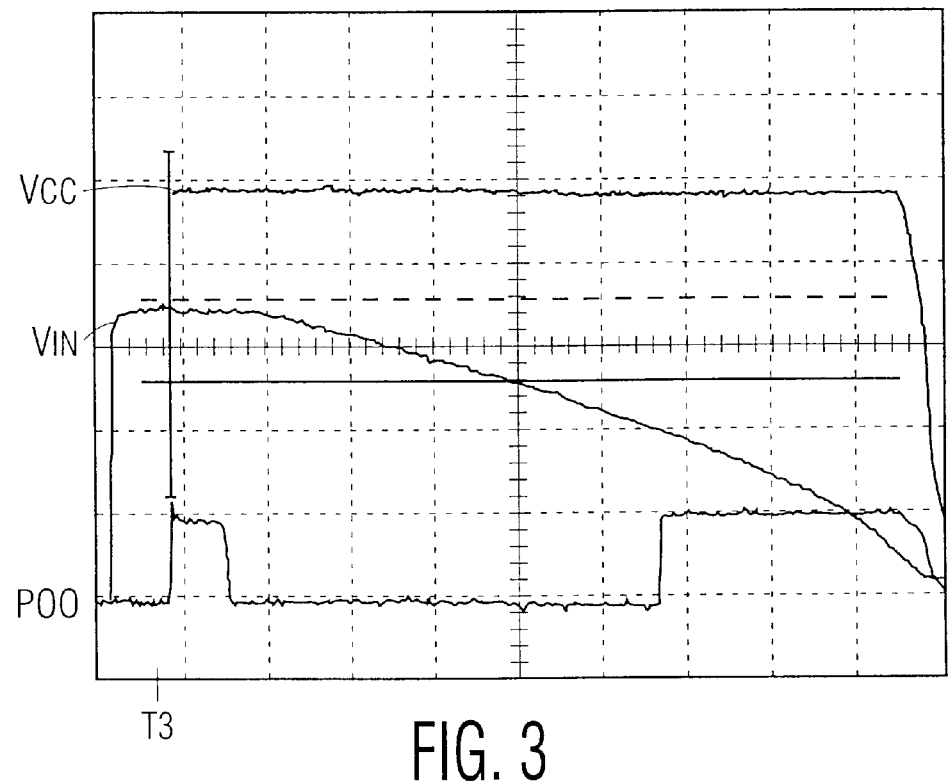
FIG. 3 shows a graph of the input voltage, the supply voltage, and the power ON signal.

On start-up, when switch Sw1 is closed, the input voltage quickly rises to its full level as shown in FIG. 3. Then, at time T3, when the flyback transformer T has transferred power to the first and second secondary windings L2 and L3, the low voltage detection circuit 18 briefly generates the power OFF/ON signal POO, indicating to the microprocessor that the supply power $V_{CC}$ is now available.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A circuit for generating a power OFF/ON signal for a microprocessor, said microprocessor being supplied power from a flyback power supply including a rectifier bridge for rectifying an A.C. power source, a flyback transformer having a primary winding connected to the rectifier bridge, a switching device for connecting the primary winding to a reference voltage, a control circuit for controlling the switching of said switching device, and a secondary winding for supplying an operating voltage to the microprocessor, wherein said circuit comprises:

means for detecting an input voltage of said flyback transformer, said means generating a control voltage proportionate to said input voltage; and means for sensing when said control voltage passes a threshold level, said sensing means generating a power OFF signal for said microprocessor when said control voltage drops below said threshold level, and a power ON signal for said microprocessor when said control voltage rises above said threshold level.

2. The circuit as claimed in claim 1, wherein said detecting means comprises said flyback transformer being provided with a further secondary winding having a polarity opposite to that of said secondary winding, a voltage across said further secondary winding forming said control voltage.

3. The circuit as claimed in claim 2, wherein said detecting means further comprises rectifier means for rectifying the voltage across said further secondary winding.

4. The circuit as claimed in claim 3, wherein said sensing means comprises a voltage divider coupled to an output of said rectifier means, and a low voltage detector having a given trigger level, said voltage divider adjusting the rectified control voltage to a value in which said threshold level conforms to said given trigger level, whereby, when said input voltage is interrupted, said control voltage drops to said trigger level before said operating voltage supplied to said microprocessor drops below a minimum value.

* * * * *